March 12, 1935.  A. B. MERRILL  1,994,144
CATHODE INSULATION
Filed April 28, 1931
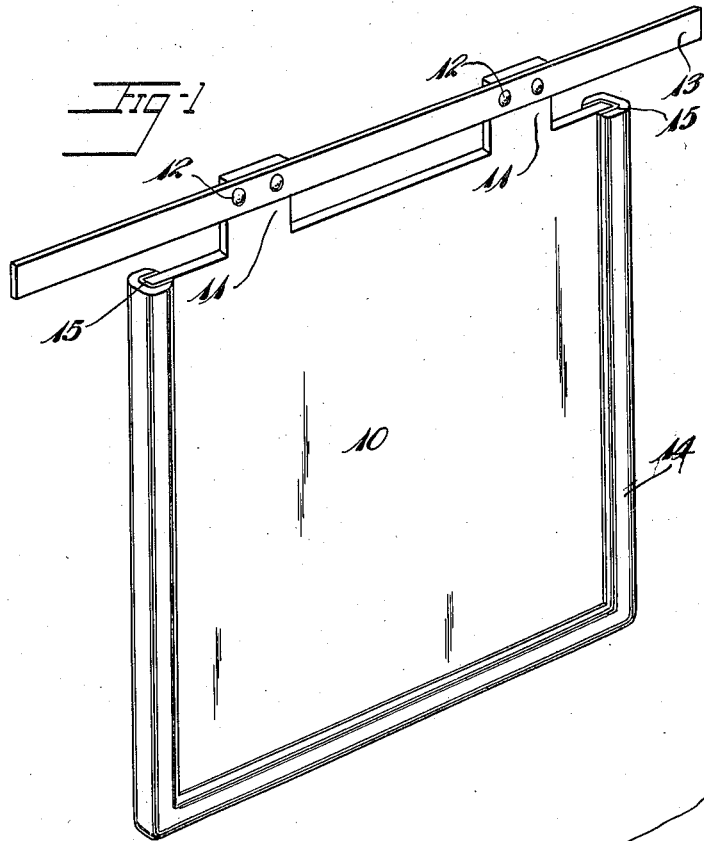
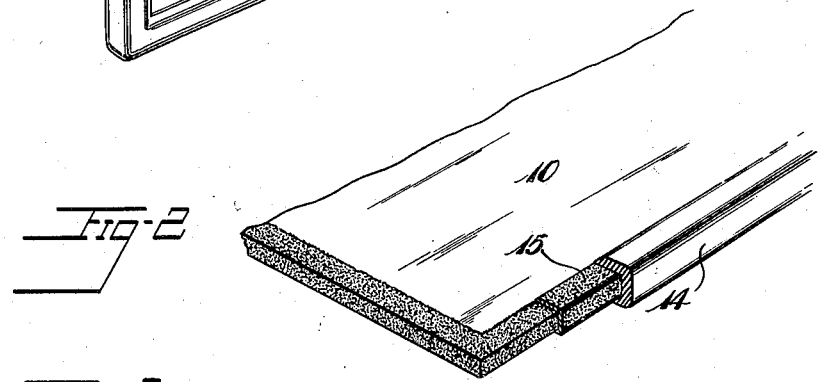
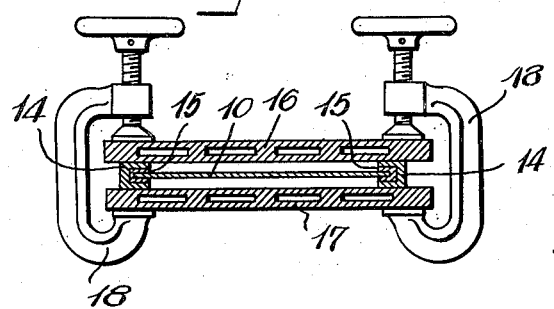
Inventor
Allan B. Merrill
By Eskin & Avery
Attys.

Patented Mar. 12, 1935

1,994,144

UNITED STATES PATENT OFFICE 1,994,144

CATHODE INSULATION

Allan B. Merrill, Akron, Ohio, assignor to The B. F. Goodrich Company, New York, N. Y., a corporation of New York Application April 28, 1931, Serial No. 533,420

5 Claims. (Cl. 204—6)

My invention relates to shielding insulation for electrodes used in the electrolytic deposition of metals and other substances and it is of especial advantage in the case of electrodes from which the deposit is stripped after it is deposited, as in the recovery or refining of copper, for example.

The chief objects of my invention are to provide a shielding insulation effectively sealed to the electrode, so that the margins of the deposit will be well defined and so that the deposit, in the case of deposits that are to be stripped from the electrode, may be readily stripped therefrom.

Of the accompanying drawing:

Fig. 1 is a perspective view of an electrode embodying and made in accordance with my invention in its preferred form.

Fig. 2 is a perspective view of a portion of the electrode showing the construction of the insulation, parts being sectioned and broken away to illustrate the structure.

Fig. 3 is a cross-sectional view of a heating and pressing device for applying the insulation, showing an electrode plate therein.

Referring to the drawing, the numeral 10 designates a plate of conducting material, the same being provided with lugs 11 riveted at 12 to a supporting current-conducting bar 13 by means of which the plate 10 may be suspended from above the fluid level of the bath of electrolyte. It will be understood that other types of electrodes may be employed.

The insulation, adapted to prevent the deposit of metal on or near the edges of the cathode plate, is applied to the plate in the form of a channel 14 closely embracing the margin thereof. The channel 14 is preferably formed of soft rubber and may be molded or extruded to shape, and preferably is vulcanized before its application to the plate, for economy of manufacture and especially to give it form-retaining properties for convenience in handling, transporting and applying it.

In order to assure and effectively seal the channel strip to the plate 10 I provide a cushion strip 15 of unvulcanized rubber between the channel 14 and the plate 10 and cement this unvulcanized strip to the plate 10 and to the channel 14.

In order to assure intimate sealing contact of the rubber with the metal plate, the rubber insulation may then be shaped against the plate by heat and pressure, as by means of molding or clamping plates, the unvulcanized cushion strips readily and intimately conforming to the surface of the metal.

The cushion strip 15 is preferably of a composition that it will not be vulcanized in this operation, and I preferably provide for this by using cushion strips and cement free from sulfur so that sulfurization of the metal plate and of the metal to be deposited thereon will be avoided.

The channel-strip may be inexpensively manufactured and shipped to the place where the electrode is manufactured or is to be used, so that an effective rubber-edging may be provided for the plate without sending it to a rubber factory.

The step of molding the unvulcanized rubber layer to conform to the metal plate and the soft rubber channel is illustrated in Fig. 3, where the numerals 16 and 17 designate steam heated plates between which the assembled cathode plate is placed. Pressure may be applied by means of C-clamps 18.

I claim:

1. An electrode comprising a metal member and shielding insulation partially covering the same and comprising a body of soft vulcanized rubber substantially coextensive with the surface insulated, and an unvulcanized layer of rubber composition between the said body and the metal member, said body being of sufficient thickness to conform to variations in the surfaces of the metal member and the rubber body and being cemented to said member and said body.

2. An electrode comprising a metal plate and a shielding insulation therefor comprising a channel strip of soft vulcanized rubber and an unvulcanized layer of rubber composition coextensive with the inner face of the channel and surrounding a margin of the plate, said layer being of sufficient thickness to conform to variations in the width of the channel and the thickness of the plate and being cemented to said plate and said channel.

3. An electrode corresponding to claim 1 in which the body of unvulcanized rubber is a sulfur-free composition.

4. An electrode plate corresponding to claim 2 in which the layer of rubber composition is a sulfur-free composition.

5. An electrode comprising a metal plate and a shielding insulation partially covering the same and comprising a body of soft vulcanized rubber substantially coextensive with the surface insulated, a layer of rubber cement applied to the metal plate, a layer of rubber cement applied to a face of the vulcanized rubber body, and an unvulcanized layer of rubber composition extending between the cemented surfaces and conforming to the irregularities of surface of the metal plate and the vulcanized rubber body.

ALLAN B. MERRILL.